UNITED STATES PATENT OFFICE.

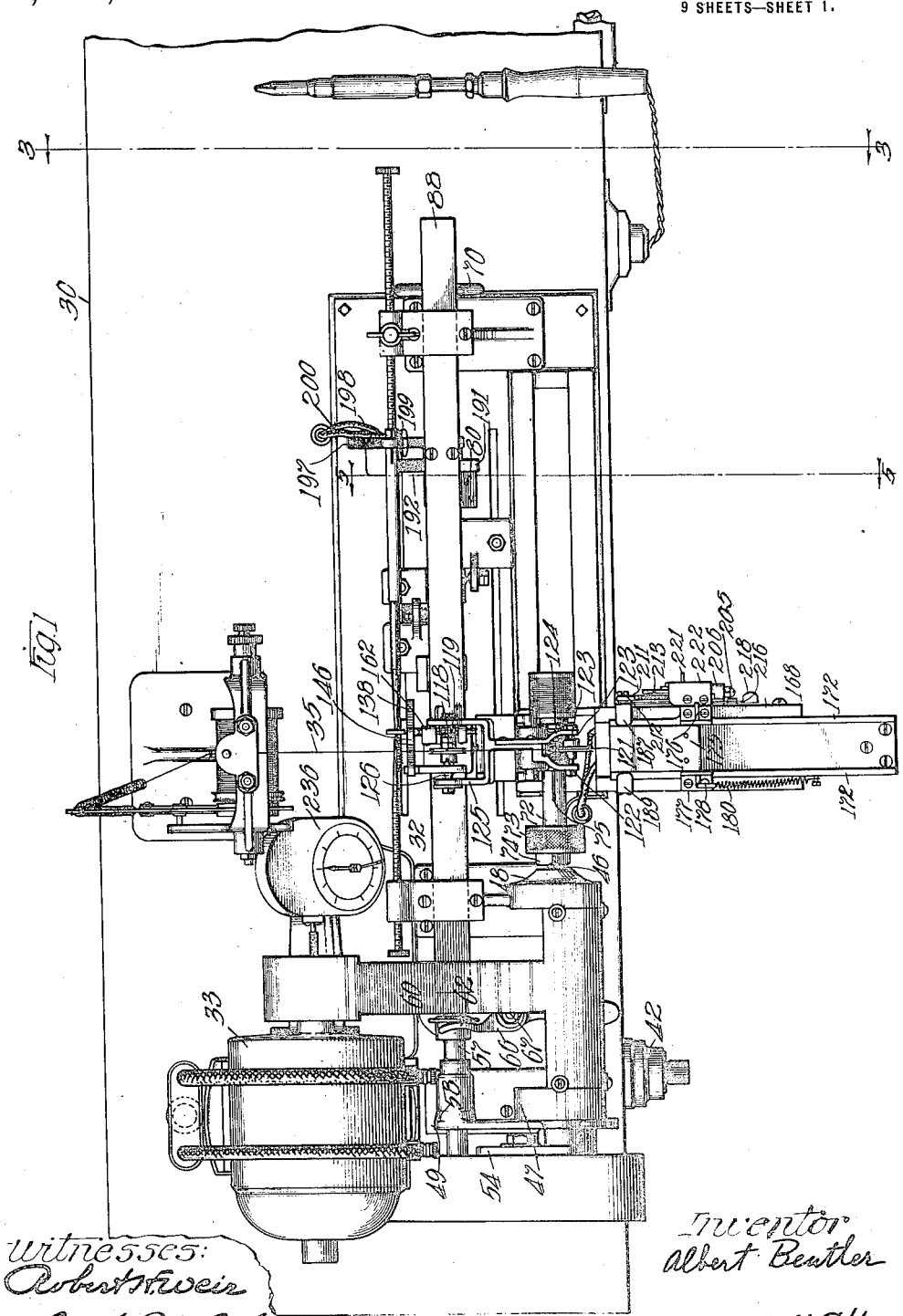

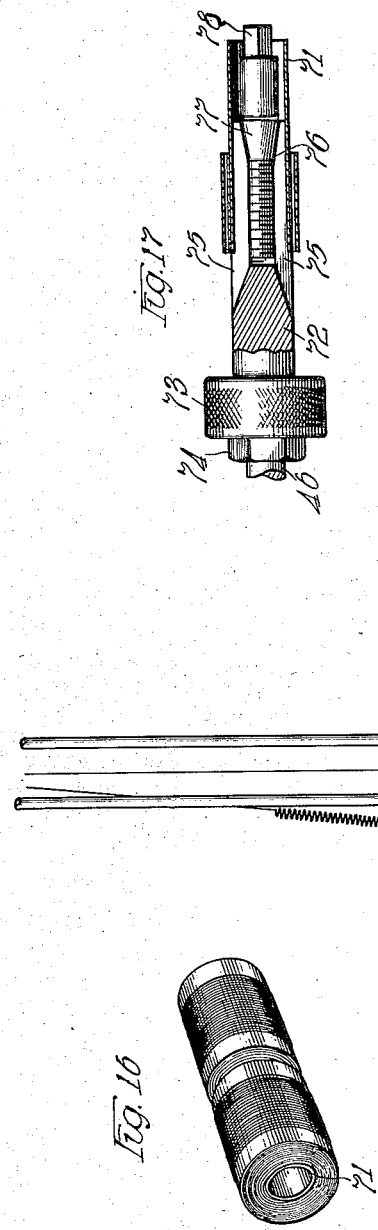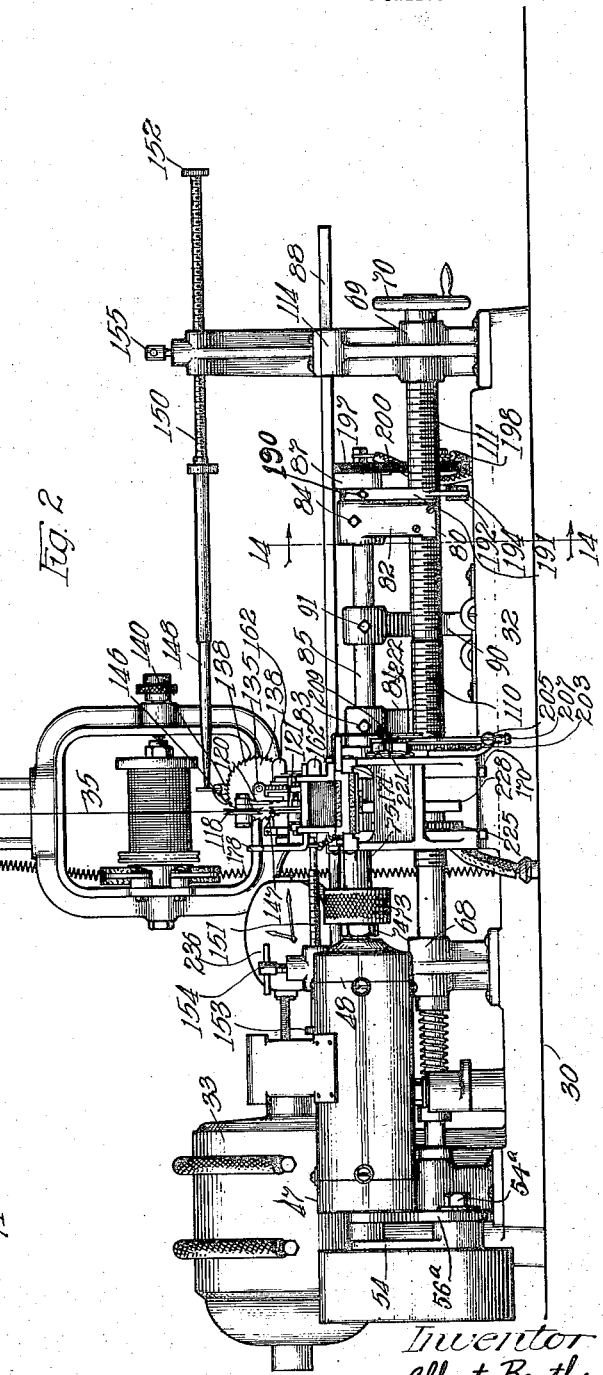

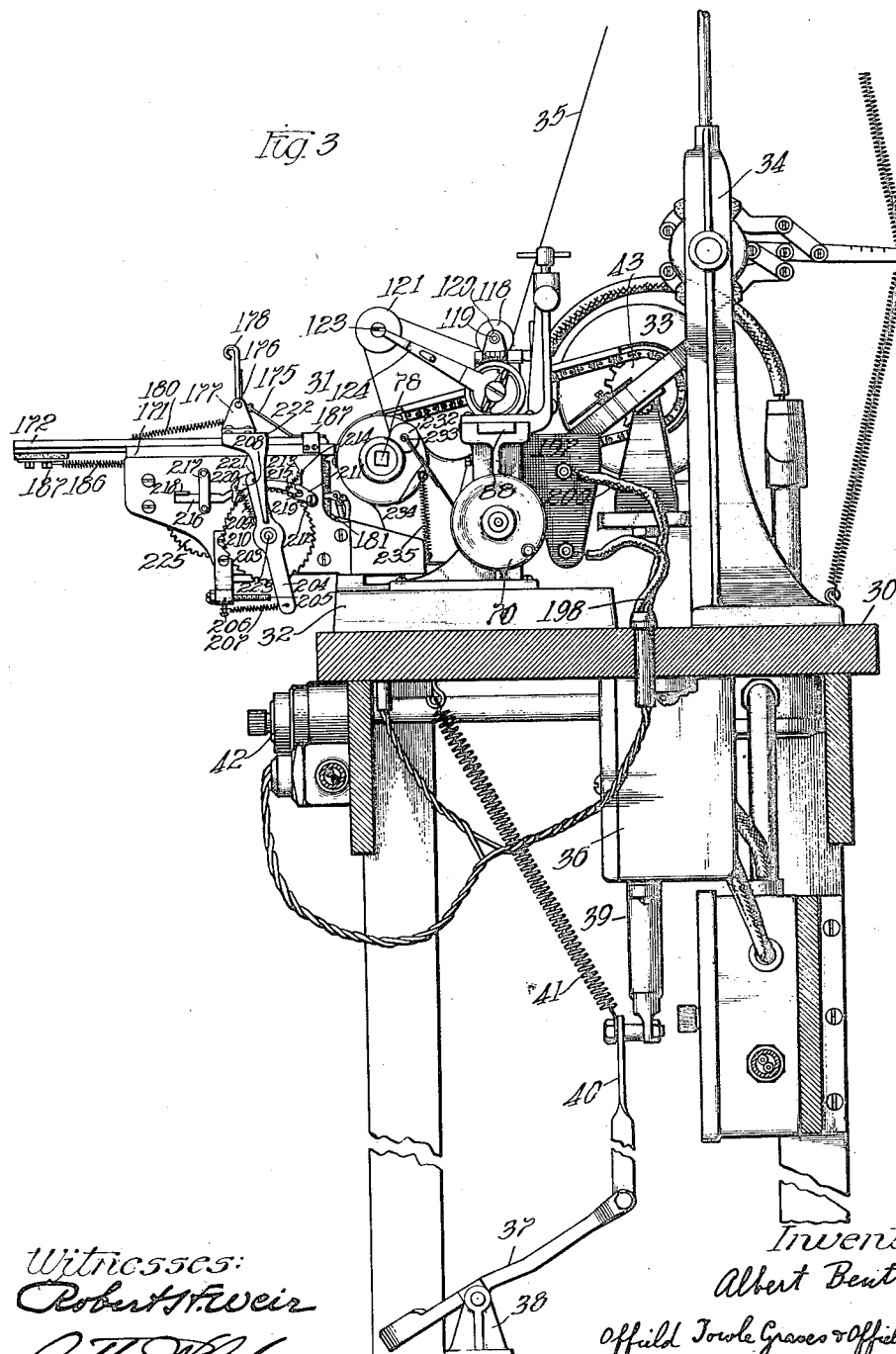

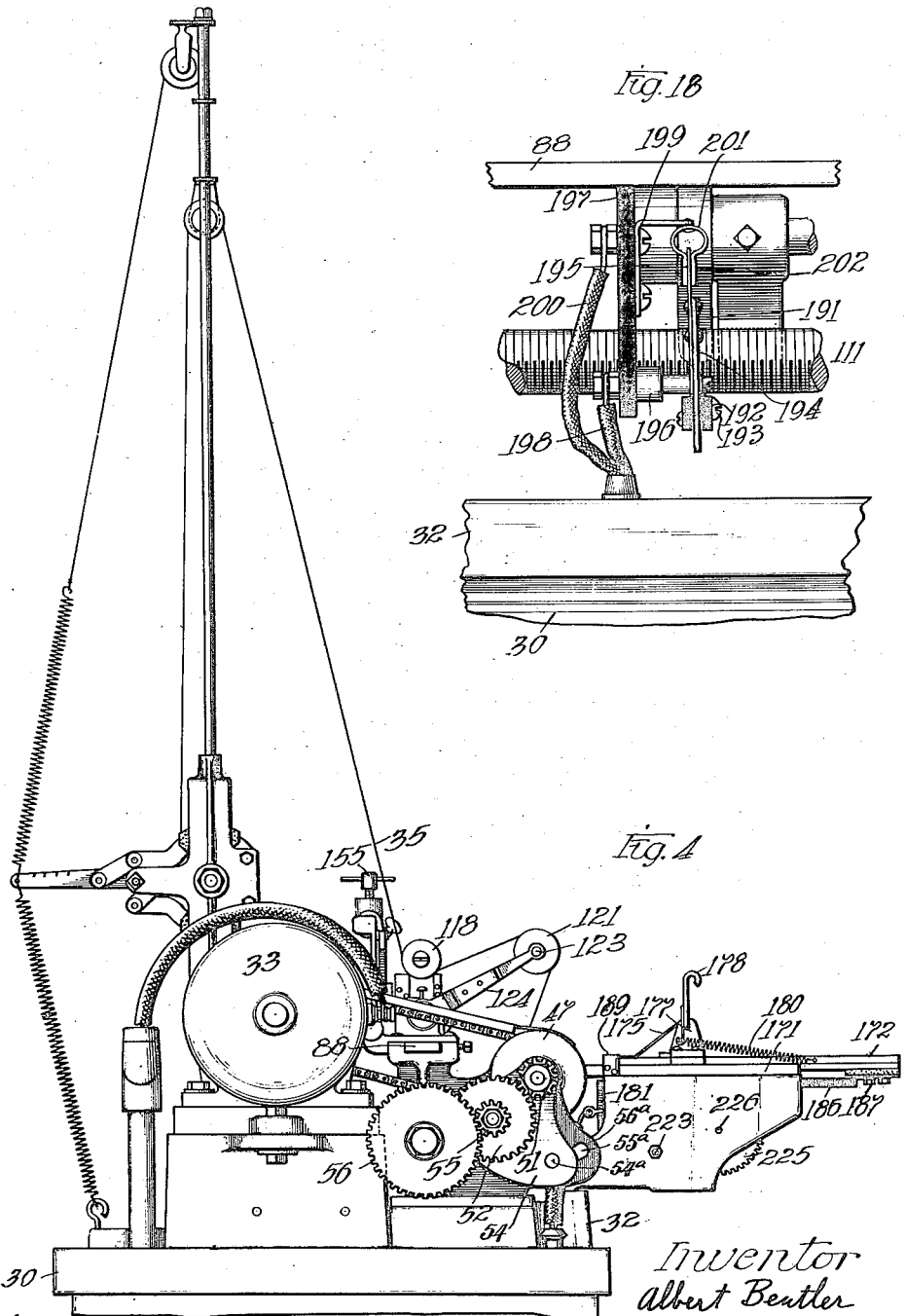

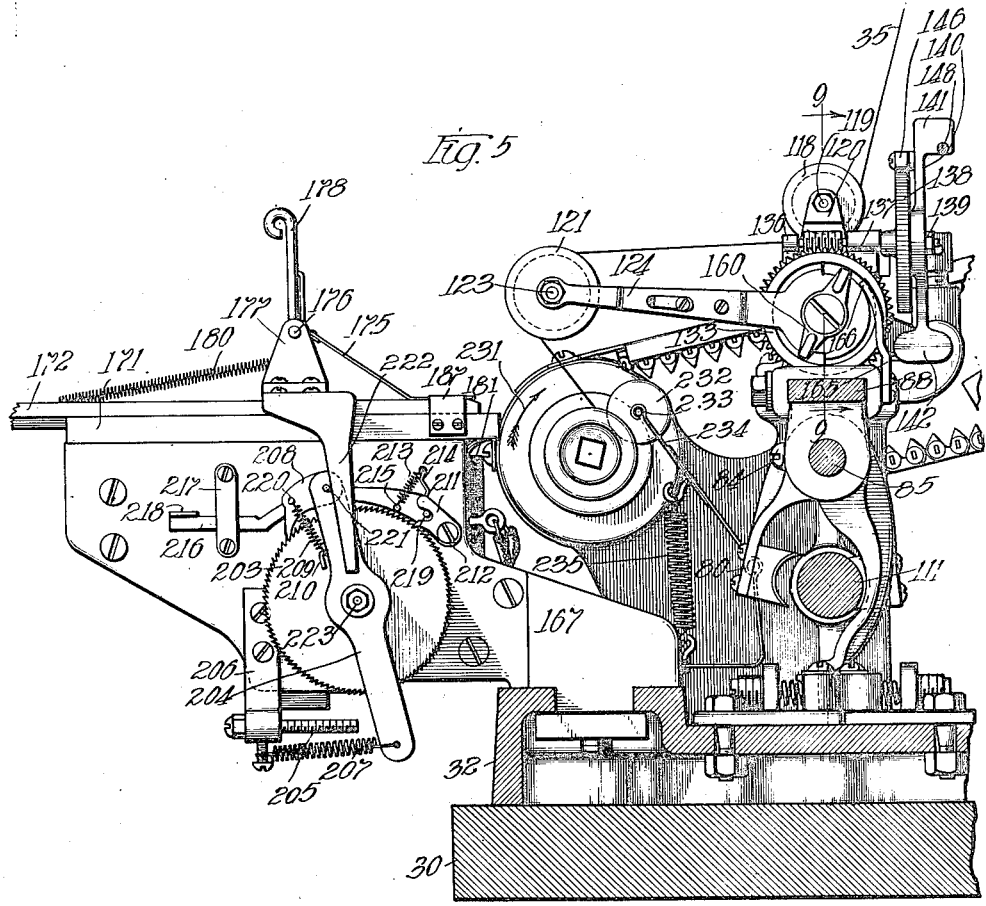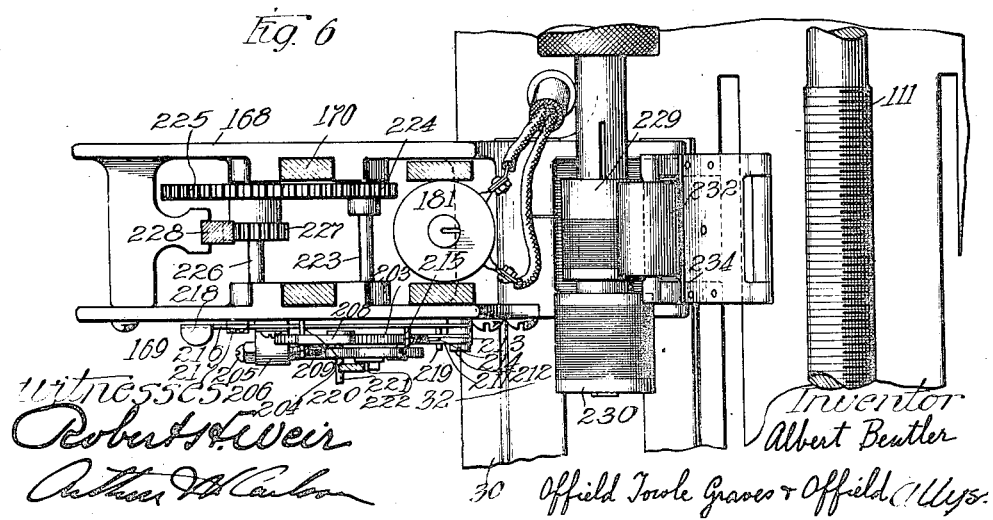

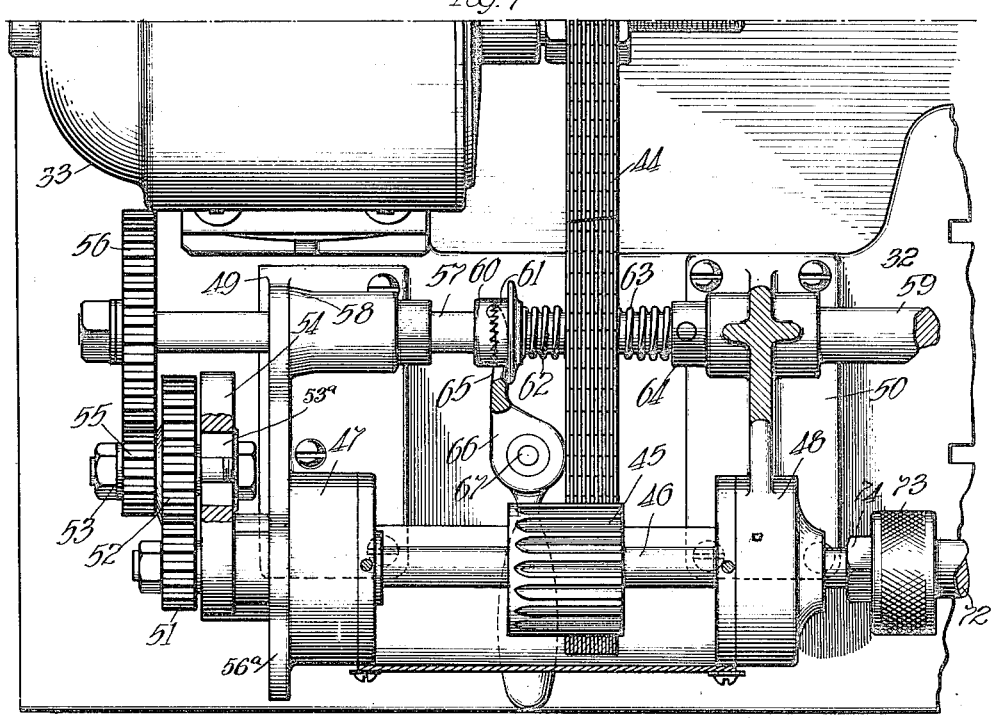
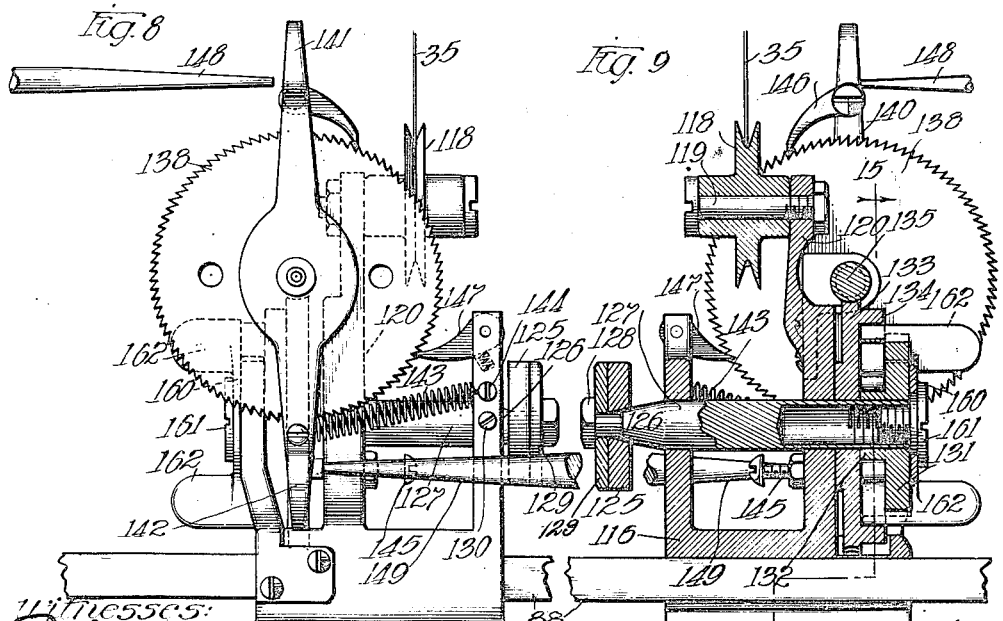

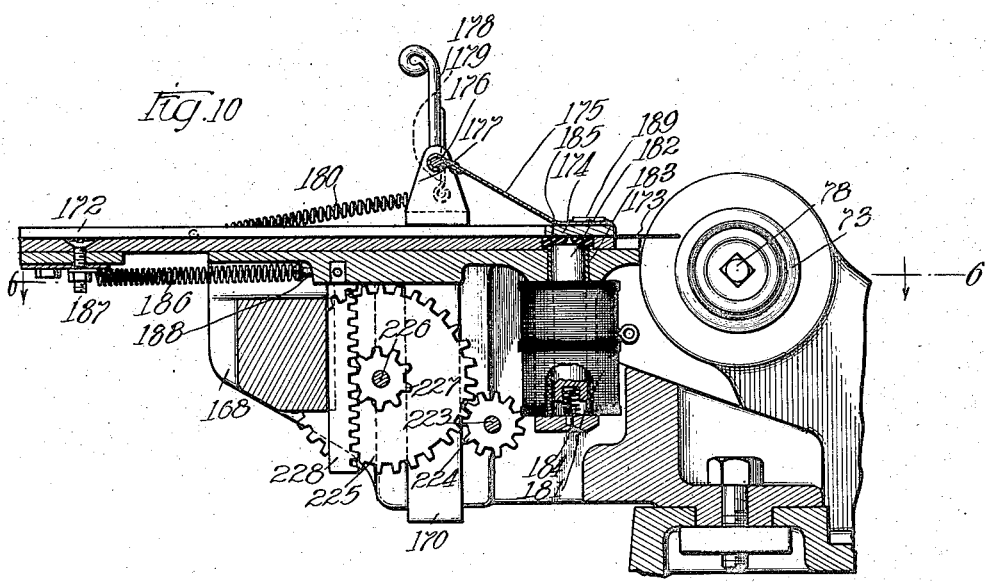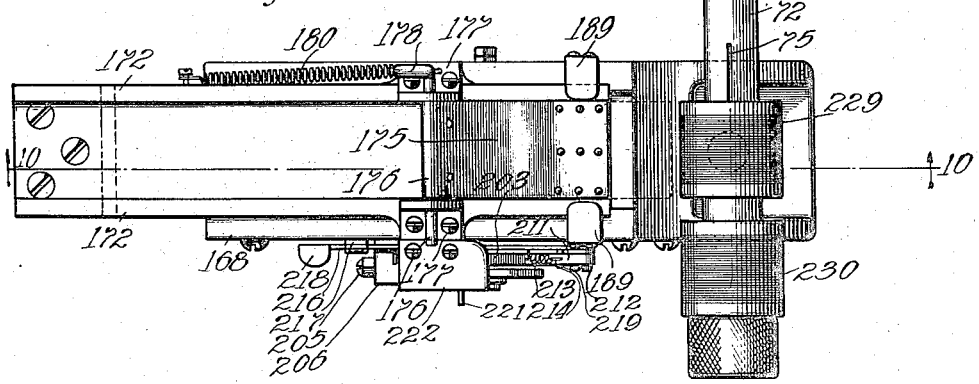

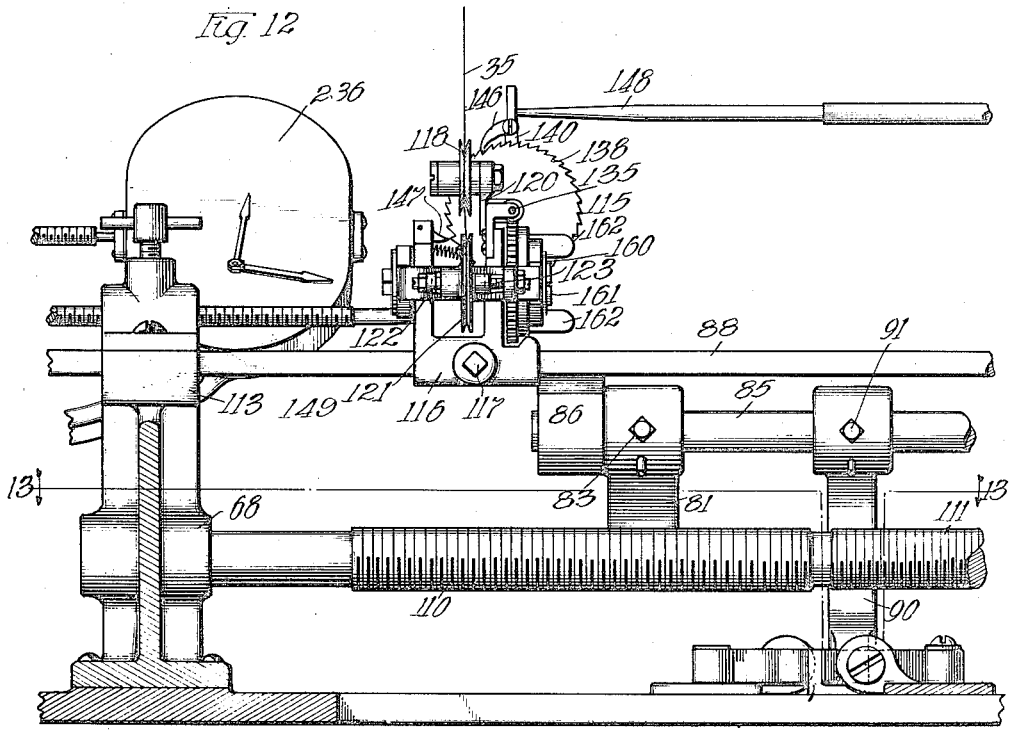

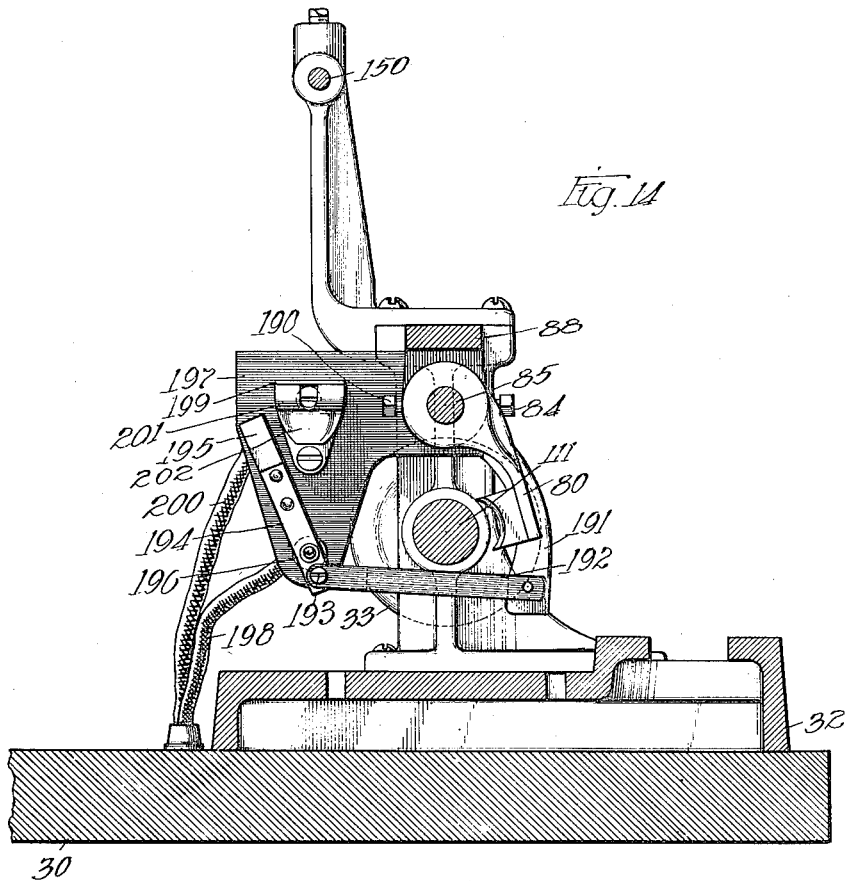

ALBERT BEUTLER, OF CHICAGO, ILLINOIS, ASSIGNOR TO BELDEN MANUFACTURING COMPANY, OF CHICAGO, ILLINOIS, A CORPORATION OF ILLINOIS.

COIL-WINDING MACHINE.

1,188,720. Specification of Letters Patent. Patented June 27, 1916.

Application filed May 19, 1915. Serial No. 29,058.

*To all whom it may concern:*

Be it known that I, ALBERT BEUTLER, a citizen of the United States, residing in the city of Chicago, county of Cook, and State of Illinois, have invented certain new and useful Improvements in Coil-Winding Machines, of which the following is a specification.

My invention relates to improvements in coil-winding machines, and has particular reference to machines designed for the automatic or semi-automatic winding of electrical helices.

In the manufacture of electrical coils, such, for instance, as are used as the secondaries of ignition coils for gas or gasolene engines, the insulation requirements, due to the extremely high voltage which is introduced between adjacent layers, make it necessary to insert a layer or layers of paper between the superposed layers of wire. The layers of paper are also necessary in order to prevent the piling up of the adjacent turns or spirals of wire upon each other, thus making the coil rough and uneven. Rough or uneven coils always occupy much more space than coils in which the layers are perfect, and the required number of turns consequently cannot be wound within the given space limits, which are in most cases established beforehand.

One of the chief problems in connection with the automatic winding of electrical coils in which paper is inserted between the adjacent layers of wire, is in the introduction of the papers while the coil spindle is rotating at the high speed which is necessary in order to obtain the desired economy in labor in the manufacture of these coils. The only practical way of introducing the papers is to allow them to be drawn in by the wire as the latter is wrapped around the spindle or coil support. When doing this, the paper is usually flat before it passes under the wire which is being wrapped around the coil, and naturally has to bend quite sharply to correspond with the curvature of the exterior surface of the layer being wound as soon as it passes beneath the wire. The high speed of rotation tends to prevent the proper bending of the paper as it is being wrapped around the coil, principally on account of air getting between the coil and the under side of the loose edge of the paper remote from, and consequently not held tightly in check with the coil by the wire which is being wound. This often causes the paper to crinkle up, and results in the formation of coils the edges of which are rough and ragged, and which are either many turns short when wound to the proper size, or are excessively bulky when wound with the required number of turns.

The prime object of my invention is to provide a coil-winding machine suitable for the rapid, economical automatic or semi-automatic winding of electrical coils of the class described, in which paper is introduced between the adjacent layers of wire.

To this end, my invention consists in the matters hereinafter described and more specifically pointed out in the appended claims.

In the drawings accompanying this description Figure 1 is a plan view of a coil-winding machine illustrating the application of my invention; Fig. 2 is a front elevation of Fig. 1, a portion of the wire-tension rig being omitted to lessen the size of the drawing; Fig. 3 is a sectional view taken on the line 3—3 of Fig. 1; Fig. 4 is an end elevation of Fig. 2, taken from the left of the figure; Fig. 5 is a section taken on the line 5—5 of Fig. 1; Fig. 6 is a section taken on the line 6—6 of Fig. 10; Fig. 7 is an enlarged plan view of the motor end of the machine showing certain parts broken away or removed, for clearness; Fig. 8 is a fragmentary enlarged rear view, in elevation, of the device for automatically elevating the wire-guide pulley; Fig. 9 is a section taken on the line 9—9 of Fig. 5; Fig. 10 is a section taken on the line 10—10 of Fig. 11; Fig. 11 is a plan view of the paper slide and spindle; Fig. 12 is an enlarged front elevation of the rear portion of the central part of the machine, showing the automatic traversing device; Fig. 13 is a section taken on the line 13—13 of Fig. 12; Fig. 14 is a section taken on the line 14—14 of Fig. 2; Fig. 15 is a section taken on the line 15—15 of Fig. 9; Fig. 16 is a perspective view of an electrical helix wound by my improved machine; Fig. 17 is a plan view, partly in section, of the spindle used for winding the coil, shown in Fig. 16; and Fig. 18 is an enlarged fragmentary rear elevation of an electrical contact device associated with the automatic traverse mechanism and for the purpose of operating the paper-injection latch-mechanism.

Referring to the drawings, 30 represents a bench or work table located a suitable distance from the ground, and to which is secured all of the winding apparatus. The winding machine is mounted upon a base casting 32 which is secured by bolts to the top of the bench 30 and receives power from an electric motor 33 situated to the left of the machine and supported by an extension of the base casting 32.

The tension device for paying off the insulated wire from the supply spool is designated as a whole 34, but inasmuch as this apparatus is on the subject of a co-pending application, executed by me of even date herewith, Serial No. 29,057, filed May 19, 1915, allowed December 20, 1915, it need not be specifically described in this application. Sufficient to say that the wire 35 is fed to the winding machine uniformly and with an even, suitably regulated tension, so that if the rotation of the machine be arrested suddenly, the wire will not overrun and kink; and if the machine be started suddenly, the wire will not snap because of the sudden pull. It should be understood in this connection, that it is important to place the wire being wound under as much tension as it will safely stand without danger of breaking. This insures the production of a uniform, tightly wound coil which will occupy a minimum space.

The motor receives its supply of current from a starting and controlling rheostat 36 which is operated by means of a foot pedal 37, pivotally mounted upon a floor-bracket 38, and connected to the spindle 39 of the rheostat 36 by means of an articulated link 40. The rheostat is normally held in off position by means of a coil tension spring 41 connected between the lower side of the bench 30 and the top of the link 40, and current is applied to the rheostat 36 and to the other electrically-operated instrumentalities associated with the machine through a main switch 42.

To the driving end of the armature shaft of the motor 33 is keyed a spur gear or sprocket 43 which drives the spindle of the winding machine by a silent chain 44, which meshes with a spur gear or sprocket 45 keyed to the winding spindle 46. The latter is rotatably supported by two spaced-apart ball bearings mounted in housings 47 and 48 at the upper ends of the brackets 49 and 50 bolted to the top of the main base casting 32. To the outer end of the spindle 46 is keyed a pinion 51 which meshes with a spur gear 52 rotatably mounted upon a pin 53 fixed in an arm 54 extending from the end of the housing 47. To the outer face of the hub of the gear 52 there is also keyed a spur pinion 55 which meshes with a large spur gear 56 keyed to the end of a stub shaft 57 which is rotatably supported in a long bearing 58 formed as a part of the bracket 49.

It should be understood that the pin 53 as shown in Fig. 7 is slidably mounted in a radial slot 53ª in the arm 54 and can be clamped at any desired distance from the axis of the shaft 46, while the arm 54 is rotatably mounted upon the end of the housing 47, as shown in Figs. 2 and 4, so that the gears 51, 52, 55, and 56 may be changed so as to admit of adjustment for different sizes of wire. The arm 54 is clamped in proper position by a hexagon-headed screw 54ª passing through an arcuate slot 55ª in a flange 56ª of the part 47. The stop shaft 57 is connected to the traverse shaft or feed-screw shaft 59 through the medium of a saw-tooth clutch composed of a member 60 rigidly secured to the end of the stop shaft 57, and a companion member 61 slidably, but not rotatably, mounted upon the reduced end 62 of the feed-screw shaft 59. The member 61 is normally forced into engagement with the member 60 by means of a coil compression spring 63 which is interposed between the back of the clutch member 61 and a thrust collar 64 pinned to the shaft 59. The clutch member 61 may be disengaged from the clutch member 60 so as to permit the shaft 57 to rotate independently of the shaft 59, by means of a clutch fork 65 upon the end of a manually-operable lever 66 mounted upon a vertical pivot 67 fixed in the base casting 32.

The clutch end of the shaft 59 is rotatably supported in a bearing bracket 68 bolted to the top of the base casting 32, and its other end is similarly supported in a bearing bracket 69 bolted upon the extreme right-hand end of said base casting. To the outer end of the feed-screw 59 there is keyed a small hand-wheel 70 which, after the clutch member 61 is released by the hand-lever 66, may be used to turn the feed screw independently of the rest of the machine, and while the spindle is idle.

The machine shown and described is equipped and adjusted for winding two-section spark coils, one of which is shown in Fig. 16. The two sections are wound independently, in reverse direction, upon a common tube 71 which is of the proper internal diameter to slip over the outside of the primary winding of the coil. The chuck for the spindle, as illustrated in Fig. 17, comprises a short cylindrical length 72 of steel, the left-hand end of which is enlarged, as shown at 73, and bored out with a tapered hole to fit upon the correspondingly tapered projecting nose of the shaft 46. The nut 74 is threaded upon the nose of the shaft behind the taper, and serves to facilitate removal of the chuck, in case the tapered joint binds for any reason. In the outer end of the spindle 72 are four longitudinal slits 75 which extend inwardly to a threaded longitudinal central hole in which screws a threaded spindle 76 having at its outer end a tapered neck 77 which enters a correspondingly tapered hole in the end of the spindle. The screw 76 extends outwardly some distance beyond the tapered neck 77 and has its end squared, as shown at 78, in order to permit the application of a wrench for turning the screw 76 so as to expand the chuck or spindle 72 and thus lock the tube 71 to the spindle. The outer end of the chuck or spindle 72 is slightly less in diameter than the interior of the coil tube 71, which allows the tube 71 to be slipped on or off when the screw 77 is slacked off. It is understood that the chucks 72 are not necessarily of the shape or construction shown, since I may use any approved means for holding the article to be wound on the end of the spindle.

Describing the mechanism for automatically traversing the wire-feed so that the adjacent turns do not pile up one upon the other, but are uniformly distributed from one end of the layer to the other, it will be observed that the shaft 59, which I have previously referred to variously as a feed-screw or traverse screw shaft, is for the greater part of its length intermediate the bearings 68 and 69 threaded, the number of threads per inch being comparatively great compared with the diameter of the shaft. Midway of its length, the screw-threaded portion of this shaft 59 is divided into two sections, one of the sections having a left-hand thread and the other section having a right-hand thread, so that when the shaft is driven continuously, a traverse nut to which the wire-guiding mechanism is secured, being brought alternately into engagement with the left-hand and the right-hand portion, is reciprocated longitudinally of the feed-screw shaft. There are two of these traverse nuts 79 and 80, one of which is provided with a left-hand thread to engage the right-hand thread on the traverse screw, and the other with a right-hand thread for engaging the right-hand threaded portion of the traverse screw. These traverse nuts 79 and 80 are secured to the ends of small fingers 81 and 82 depending from and secured by means of set screws 83 and 84 to a rod 85 parallel with the axis of the traverse screw 59, and rotatably mounted in a pair of small blocks 86 and 87 mounted upon the under side of the feed-bar 88. The hub of the arm 81 and the side of the finger 191 which is also fixed on the control rod 85, as will be hereinafter described are faced off so as to fit up against the correspondingly finished inner adjacent surfaces of the blocks 86, and 87 and are adjusted as closely as possible to said blocks so that there shall be no longitudinal lost motion or backlash of the rod 85 with reference to the blocks 86 or the feed-bar 88. The rod 85, however, is free to rotate in the blocks 86.

The nuts 79 and 80, as best shown in Fig. 5, comprise rectangular blocks curved and threaded to fit approximately one-third of the circumference of the feed-screw, their supporting arms 81 and 82 being adjusted in the proper angular position upon the rod 85, so that only one of the nuts is in engagement with the feed-screw. The automatic reversal of the direction of movement of the feed-bar 88 is effected by means of a traveling cam-piece 89 which constitutes the depending tip of a cam-arm 90 which is secured to the oscillatory rod 85 by means of a set screw 91. The cam-piece 89, which manifestly partakes of the same reciprocatory movement as the feed-bar 88 and the oscillatory rod 85, travels in a rectangular path around the stationary cam-block 92 which stands up from the edge of a stationary plate 93, secured upon the base-casting 32 by means of a bolt 94 so as to permit of longitudinal adjustment with reference to the feed-screw shaft 59.

The traveling cam-piece 89 is caused to move in the rectangular path referred to, by a pair of opposed, similarly shaped fingers 95 and 96, which are pivoted at 97 and 98 upon small castings 99 and 100 which are adjustably secured upon the base-casting 32. These presser fingers have their free ends facing toward each other, and beveled off, as shown at 101 and 102, so that the cam-piece 89, as it reciprocates around the cam-block 92, will press the fingers 95 and 96 away from the cam-block 92 against the influence of the springs 103 and 104 which are interposed between the outsides of the fingers 95 and 96 and the upstanding lugs 105 and 106. In order to vary the strength of these springs 103 and 104, they have their outer ends housed in threaded thimbles 107 and 108, screwed into holes threaded in the lugs 105 and 106.

Describing the operation of the cam mechanism just referred to, and assuming that the machine is in operation with the feed-screw 59 rotating continuously, in the position illustrated in Fig. 13, the cam-piece 89 which, as shown, is in front of the cam-block 92, is traveling in the direction of the arrow 109 under the influence of the right-hand traverse nut 79 which has a right-hand thread, and is in engagement with the right-hand thread 110; it will be seen that in its movement in the direction of the arrow 109, the cam-piece 89 has engaged the bevel surface 102 on the end of the finger 96 and has pushed the finger 96 back against the influence of the spring 104, so that as soon as the left-hand edge of the cam-piece 89 passes beyond the right-hand edge of the cam-block 92, the cam-piece 89 will be thrust back past the right-hand end of the cam-block 92. The instant this occurs, the arm 90, which carries the cam-piece 89 at its lower end, will oscillate the rod 85 in a direction to throw the traverse nut 79 out of engagement with the right-handed thread 110, and to throw the traverse nut 80 into engagement with the front side of the left-handed thread 111. The result will be that the direction of longitudinal movement of the feed-bar and its appendages, including the cam-piece 89, will be reversed and the cam-piece 89 will thus commence to move in the direction of the arrow 112 and behind the rectangular cam-block 92. As the cam-piece 89 approaches the end of its movement in the direction of the arrow 112 and behind the cam-block 92, it will engage the bevel surface 101 of the cam-finger 95 and will force the same back against the pressure of the spring 103, the ball of the finger finally resting upon the flat rear side of the cam-piece 89 in readiness to force the cam-piece in front of the cam-block 92 as soon as the right-hand edge thereof snaps beyond the left-hand edge of the cam-block 92. When this occurs, the left-handed traverse nut 80 will be thrown out of engagement with the left-handed thread 111 on the feed-screw, and the right-handed traverse nut 79 will again be brought into engagement with the right-handed thread 110 of the traverse screw. The feed-bar and the cam-piece 89 will then commence to travel in the direction of the arrow 109, and this cycle of operations will be repeated so long as the machine is operated.

It should be understood that the lengths longitudinally of the cam-piece 89 and the cam-bock 92 are so arranged that the sum of their lengths is equal to the required travel of the wire-guiding means; that is to say, the required length of the layers of wire in the coil being wound upon the machine. It should also be understood that the thicknesses of the parts 92 and 89 are such that when the arms 81 and 82 are adjusted in their proper angular positions on the rod 85, the traverse nuts 79 and 80 are brought alternately into effective engagement with their respective threads 110 and 111.

The feed-bar 88 previously referred to, which carries the wire-guiding means, reciprocates in guides 113 and 114 formed in the upper portions of the brackets 68 and 69. The wire-guiding means, which is designated as a whole 115 (see Fig. 12), is carried by a small casting 116 having its under side shaped out to fit the rectangular feed-bar 88 so that it may be adjusted thereon in any longitudinal position by means of a set screw 117.

Referring to Figs. 5, 8 and 9, it will be seen that the wire 35 as it enters the machine passes under a small sheave 118 mounted to rotate freely upon a stud 119 secured in the upper end of an extension 120 projecting upwardly from the casting 116. The wire then passes to the front of the machine and over a guide-sheave 121 which is rotatably mounted upon a pair of adjustable cone centers 122 and 123 (see Figs. 1 and 12) secured in the opposite sides of a fork at the end of a pivoted arm 124. The rear end of this arm 124 is also forked, the left-hand limb 125 having bearing upon a cone center 126 at the end of a bolt 127 (see Figs. 8 and 9), the outer end of which is threaded to accommodate a nut 128 and a large non-rotatable washer 129 which may be forced up against the circular end of the limb 125 so as to prevent the arm from swinging too freely and executing false movements, due to the vibration of the machine when running at high speed. The rod 127 is secured in the casting 116 by means of a set screw 130. The opposite limb 131 of the rear fork of the arm 124, as shown in Figs. 9 and 15, is enlarged and made circular in shape, having secured concentrically to it a flat circular hub 132, the whole being drilled out centrally for the cylindrical end of the rod 127, which projects beyond the side of the casting 116. Between the hub 132 and the side of the casting 120 there is interposed a worm-gear 133, the outer face of which is provided with an annular flange 134 which surrounds the part 132, and, in conjunction with the latter, constitutes a clutch, as will be described later.

Referring to Figs. 5 and 9, it will be seen that the worm-gear 133 is driven by a worm 135, which is mounted above the part 133 in a pair of bearing lugs 136 and 137, integrally formed on the side of the extension 120. The rear end of the worm-shaft carries a ratchet wheel 138 securely keyed to the same, and between the rear face of said ratchet wheel 138 and an end nut 139 there is loosely mounted a pawl-lever 140. The pawl arm 140, as shown in Figs. 8 and 9, stands substantially vertical in its normal position and has formed at its upper end a blade 141, and at its lower end a blade 142, both of said blades having their planes substantially vertical and coincident with the plane of the axis of the worm. The pawl arm 140 as a whole is retracted by means of a spring 143, one edge of which is secured to a pin 144 fixed in the side of the casting 116, and the other end of which is attached to the lower extension of the pawl lever 140 and pulls the bottom blade 142 against the end of an adjustable stop screw 145. The upper end of the pawl lever carries a pivoted pawl 146 which engages the teeth of the ratchet wheel 138, reverse movements of which are prevented by a spring-pressed stop-pawl 147 pivoted upon the casting 116. The pawl lever 140 is oscillated to intermittently rotate the ratchet wheel 138 through the reciprocatory movements of the casting 116 in its travel with the feed-bar 88. To this end, I position a pair of stationary pencil-shaped rods 148 and 149 in the path of movement of the blades 141 and 142 so that as the feed-bar is reciprocated, the blades 141 and 142 will engage the pencils 148 and 149 and thus oscillate the pawl lever 140, causing the ratchet wheel to be intermittently rotated. The pencils 148 and 149 are carried upon the ends of threaded rods 150 and 151 mounted in tapped holes in the tops of the castings 68 and 69. The rods 150 and 151 are provided with milled heads 152 and 153 to facilitate adjustment of the pencils 148 and 149, the adjustments being made secure by clamping screws 154 and 155. The worm-gear 133 is not keyed to the shaft 127, but rotates freely thereon, and always rotates in the same direction. Its rotary motion is transmitted to the arm 124 through the parts 132 and 131 by means of a pair of flat clutch dogs 156 and 157, the outer ends of which are curved so as substantially to fit the inner diameter of the annular flange 134, and the inner ends are made circular so as to fit a pair of circular pockets notched into the edge of the part 132. The outer ends of the clutch dogs 156 and 157 are normally forced in the direction of the arrow 158 by means of a pair of springs 159 secured in the outer ends of the clutch dogs and bearing against the circumference of the part 132. The lengths of the clutch dogs 156 and 157 are such that under the influence of the springs 159 they will engage the inner circumference of the flange 134 before they assume a radial position. They will thus act as toggle members, which will prevent downward movements of the arm 124 with reference to the relatively stationary worm-gear 133, while permitting the arm to be raised by hand whenever occasion arises. It is also apparent that the arm 124 will partake of the same rotary movement as the gear wheel 133 so long as the clutch dogs 156 and 157 are pressed into engagement with the inner circumference of the flange 134 by the springs 159. In order to permit the operator to lower the arm 124 into its proper initial position, she forces back the outer ends of the clutch dogs 156 and 157 against the action of the springs 159 by means of a release member 160, comprising a flat piece pivotally mounted upon the shoulder of a screw 161 threaded into the hollow end of the pin 127 and having at its outer ends a pair of finger pieces 162, the inner ends of which 163 are reduced in size to enter between the annular flange 134 and the part 131 and engage the edges of the clutch dogs 156 and 157. It is manifest that if the operator takes hold of the projecting ends 162 of the release member and turns the same in a direction opposed to that shown by the arrow 158 in Fig. 15, the clutch dogs will be moved out of gripping engagement with the inner circumference of the annular flange 134, and further movement of the release member in said rotary direction will cause the parts 163 to engage the ends of the notches 164 formed in the edge of the part 131, which will cause the arm 124 to be forced downwardly.

As previously stated, the worm-gear 133, has a uni-directional rotary movement by virtue of the oscillatory movements of the pawl member 140, caused by the reciprocatory motion of the feed-bar. It is conceivable that while testing the machine, or when the latter is operated by a green hand, the machine may be left running with the feed-bar reciprocating, which would result in a gradual elevation of the arm 124. In order to arrest this movement of the arm 124 before it can strike any other part and so result in damage to the mechanism, I secure upon the lower edge of the casting 116 a curved safety stop member 165, the end of which is located in the path of one of the thumb-pieces 162 on the release member 160, so that in the course of the upward rotary movement of the arm 124, the end 166 of the stop 165 will be engaged by the release member, the motion of which will be arrested and hence cause a release of the clutch dogs 156 and 157 upon any further rotary movement of the worm-gear. The result will be that it will be impossible for the worm-gear 133 to raise the arm 124 more than a certain distance; after this distance is reached, the clutch dogs 156 and 157 slip and cause the worm-gear 133 to rotate idly around the parts 131 and 132.

The above described mechanism carried by the casting 116 is for the purpose of automatically elevating the guide-pulley 121 as the coil being wound increases in diameter, so that the guide-pulley 121 will always occupy the same position relative to the surface of the layer of wire being wound.

Describing the mechanism for introducing the layers of paper into the coil between the adjacent layers of wire, referring to Figs. 5, 6, 10 and 11, it will be observed that at the front side of the base-casting 32 there is secured a stationary casting 167 which extends outwardly from the base 32 and upwardly and substantially in front of the end of the winding spindle. This base-casting 167 comprises a pair of side frames 168 and 169, in the opposed inner sides of which are shaped out a pair of rectangular slide-ways which accommodate vertical rectangular sliding columns 170 which constitute the supports of the paper-slide elevator 171, which is a cast-iron plate secured to the tops of said columns 170. When commencing the winding of a coil, the elevator 171 rests directly upon and is supported by the tops of said frames 168 and 169. Each strip of paper which is introduced into the coil is placed by hand in a small trough or channel of the required width, which is milled in the top of the paper injector 172, which itself slides in guideways milled in the top of the elevator 171. The paper which is being introduced into the coil, is shown at 173 in Fig. 10, and is pressed down in the bottom of the channel of the injector 172 by means of a leather pad 174 carried upon the end of a thin leaf-spring 175. The spring 175 is rigidly connected to a transverse rod 176 rotatably mounted in a pair of small brackets 177 mounted on the top of the injector 172. One of the outer end extensions of the shaft 176 is bent upwardly, as shown at 178, so as to furnish a handle by which the operator can lift the pad 174, and to said end extension 178 there is also secured a small downwardly projecting rod or wire 179, the lower end of which extends below the shaft 176 and is attached to the end of a coil tension spring 180, which thus forces the pad 174 down upon the top of the paper in the channel of the injector. The paper injector is operated electrically by means of a solenoid 181. The latter is of the iron-clad type and projects downwardly beneath the front end of the elevator 171, which is conveniently made of cast iron so as to constitute part of the magnetic circuit for the solenoid. The plunger 182 of the solenoid slides in a brass bushing 183 set vertically in the end of the elevator casting, and is forced upwardly into its normal inactive position by means of a spring 184. The upper end of the core 182 is faced off square so as to constitute the latch for the paper injector, whereby the latter is held in its out position. To this end, I insert in the front end of the injector a circular fiber bushing 185, the under side of which is drilled out a short distance to freely admit the upper end of the core 182. When the solenoid 181 is energized to pull down the core 182 and thus release the paper injector, the latter is pulled inwardly toward the winding spindle by means of a coil tension spring 186, one end of which is connected to a screw 187 in the outer end of the injector, and the other end is attached to a screw 188 fixed in the under side of the elevator. The inner end of the injector is prevented from rising out of the guides in the top of the elevator by means of a pair of clips 189 screwed to the side of the front of the elevator casting and projecting inwardly over the opposite sides of the injector.

The solenoid 181 is operated automatically by the reciprocatory movement of the feed-bar 88 which, as before described, causes an oscillatory movement of the control-rod 85. As seen in Figs. 1, 2, 3, 14 and 18, to the rod 85 intermediate the parts 82 and 87 there is secured, by means of a set screw 190, a depending arm 191, to the lower end of which is attached an articulated fiber link 192. The rear end of this link 192 is pivotally connected at 193 to a brass arm 194 secured to a blade 195 pivoted at 196 upon a vertical fiber plate 197 supported from the lower side of the feed-bar 88. The pivot 196 constitutes the electrical connection between the contact blade 195 and the flexible electrical conductor 198. Above the pivot 196 and upon the said fiber plate 197 there is secured a small brass bracket 199 which is electrically connected to the flexible electrical conductor 200 and supports the spring contact member 201, the latter being formed with resilient lips 202 normally resiliently forced into contact with each other and located in the plane of movement of the contact blade 195. The latter is oscillated whenever the control-rod 85 is oscillated, by the cam mechanism shown in Figs. 12 and 13. When the control-rod 85 oscillates to reverse the reciprocatory movement of the feed-bar, the blade 195 passes between the lips 202 of the contact piece 201 and closes the circuit of the solenoid 181, causing the same to pull down the core 182 and release the paper injector.

Describing the mechanism for automatically elevating the paper injector as the coil being wound increases in size, it will be noticed that on the side of the frame 169 there is pivotally mounted a ratchet wheel 203, the same pivot also carrying a pawl lever 204. The lower end of this pawl lever is retracted toward a stop formed by the end of a screw 205 threaded in the lower end of a small bracket 206 secured to the side of the frame 169, by means of a coil tension spring 207. The upper end of the pawl lever 204 carries a pivoted pawl 208 which is pulled into engagement with the teeth of the ratchet wheel 203 by means of a coil tension spring 209, the lower end of which is secured to the pawl lever at 210. Retrogressive movements of the ratchet wheel 203 are prevented by a second pawl 211 pivoted at 212 upon the side of the frame 169 and forced into engagement with the teeth of the ratchet wheel by a coil spring 213 connected between a small arm 214 set into the end of the pawl 211, and a pin 215 projecting outwardly from the side of a hand-lever 216, which is also pivoted at 212 upon the same axis as the pawl 211. The hand lever 216 extends toward the front of the frame 169 and is guided by a strap 217 screwed to the side of the frame 169. A thumb-piece 218 is provided on the end of the lever 216 so that the operator may raise the same and simultaneously disengage the pawls 208 and 211 from the ratchet wheel through the agency of a pin 219 which engages the pawl 211 and the rear extension of the pin 220 being engaged by the upper edge of said lever 216 when the latter is raised. The pivot pin 221 at the upper end of the pawl lever 204 extends outwardly from the side of the lever a sufficient distance to be engaged by the edge of a finger 222 secured to and depending from the upper side of the paper injector. The paper injector, as it moves inwardly when released by the solenoid 181, allows the pawl lever 204 to be retracted against the stop 205 by the spring 207, and when it is pulled back again into latched position by the operator, the finger 222 engages the pin 221 at the upper end of the pawl lever and advances the ratchet wheel a definite amount, depending upon the setting of the adjustable stop 205. The ratchet wheel 203 is keyed upon the end of a shaft 223 journaled in the frames 168 and 169 and carrying a pinion 224 which meshes with a spur gear 225 keyed to a shaft 226, also journaled transversely in the frames 168 and 169. To the shaft 226 is also keyed a rack-gear 227 which engages a vertical rack-bar 228, the upper end of which is secured in the bottom side of the elevator casting 171. It is manifest that reciprocatory movements of the paper injector 172 will, through the above train of mechanism, effect the gradual raising of the elevator-casting 171 carrying the paper injector 172. When the hand-lever 216 is lifted to raise the pawls 208 and 211 out of engagement with the ratchet wheel, the weight of the elevator and paper injector causes the same to descend into normal position with the elevator 171 resting upon the tops of the frames 168 and 169.

Describing the operation of the machine and referring more particularly to Figs. 5 and 6, it will be seen that the machine is in the act of winding the second section 229 of a coil, similar to the one illustrated in Fig. 16, the first section 230 having been completed. The winding spindle rotates in the direction of the arrow 231. The papers which are interposed between the several layers of the coil are supplied to the operator of the machine, cut to length and of the proper number, so that all she has to do is to insert them into the trough of the injector 172, one by one, while the machine is running. To insert a paper in the machine, she pulls back upon the handle 178 and lifts the leather pad 174 from out of contact with the bottom of the paper trough 172 a sufficient distance so that she can lay the paper in place, as is shown at 173 in Fig. 10. The handle 178 is then released, allowing the spring 180 to pull the pad 174 rather tightly down upon the top surface of the paper. It is understood that the papers are cut very slightly narrower than the distance between the edges of the channel or trough in 172 so that they will not stick when being inserted. As the machine rotates, the wire travels under the wheel 118, over the pulley 121, and by the rotation of the spindle is wrapped around the coil upon the outer surface of the layer of paper which was last applied to the coil. As the winding spindle rotates, the threaded shaft 59, which is engaged with one or the other of the traverse nuts 79 and 80, causes the feed-bar to move in a longitudinal direction parallel with the axis of the winding spindle, and so causes the guide-pulley 121 to travel longitudinally of the coil. The pitch of the threads of the shaft 59 and the change-gears connecting said shaft with the winding spindle, is so arranged that for each revolution of the winding spindle the feed-bar is moved longitudinally a distance equal to the thickness or diameter of the wire being wound, so that the wire is wrapped around the coil with the turns lying uniformly side by side, and not overlapping or unduly separated. The length of each layer of wire on the coil is determined by the dimensions of the cam-block 92 and the traveling cam-piece 89, and when the latter slips past the cam-block, as previously described, the direction of longitudinal movement of the feed-bar is automatically reversed and the guide-pulley 121 begins to travel in the reverse direction and to commence a new layer of wire. At the instant of reversal of the traveling feed-bar, the contact blade 195 wipes between the contact lips 201 and closes the circuit of the solenoid 181, causing the plunger 182 to be depressed. The injector 172 thus released, shoots forward under the influence of the spring 186 and the end of the paper 173 is pushed under the wire as it is being wrapped around the coil. The loose end of the paper is thus caught under the wire as the latter is wrapped around the surface of the coil, and the initial grip thus obtained on the loose end of the paper is sufficient to draw the entire strip out of the injector and wrap the same completely around the coil.

In order to cause the paper to enter the coil evenly without slipping or crinkling, I prefer to mount behind the coil a rubber roll 232 which is rotatably supported on a spindle 233 journaled in the fork of a plate 234, of rather thin resilient sheet metal, which is pulled down with considerable force by means of a coil spring 235. The rubber roll 232 is thus forced quite strongly, but resiliently, into engagement with the surface of the coil as it is being wound, the friction between the surfaces of the coil and roller causing the latter to roll upon the coil and rotate in its bearing. The plate 234 is made quite flexible so that the roller will accommodate itself to eccentricities of the coil surface. As soon as the paper 173 has been injected and wrapped around the coil, the operator immediately pulls back the injector 172 by means of a handle 178, the injector being withdrawn a sufficient distance to allow the core 182 of the solenoid to snap into the recess of the fiber bushing 185. The injector is thus retained in its retracted position until the feed-bar has traveled a sufficient distance to again automatically reverse the direction of travel and again energize the solenoid. It should be understood that the operator pulls back the injector 172 and inserts a fresh paper immediately after the last preceding paper has been injected, so that a fresh paper is wrapped around the coil each time that the direction of the feed is changed; thus a fresh paper is inserted every time a single layer is completed.

An important feature of my invention is the manner in which the paper injector 172 is automatically elevated by the mechanism shown in Figs. 5, 6 and 10, as the coil is being wound. Since these coils must be wound at high speed to secure the desired output at low cost, the machine must be constructed to attain a speed of at least three thousand revolutions per minute. However, at such a speed I have found it very difficult, if not impossible, to inject the papers so that they will be wrapped evenly around the coil, unless the paper is caused to engage the wire and enter the coil at substantially the same level, independently of the diameter of the coil, the last layer of which often has a diameter three times the diameter of the core upon which this layer is wound. The mechanism for effecting this automatic elevation of the paper injector has already been described, and it is unnecessary to again refer to the same. I have also found it to be of great importance, in order to secure a perfect, uniform feed or traverse of the wire as it is being wound, that the guide-pulley 121 should always be maintained at a definite distance above the surface of the layer being wound. This is accomplished by means of the mechanism designated as a whole 115, which has also been described previously.

After a coil has been completed and removed, the operator, by means of the finger-piece 218, raises the lever 216, and the elevator 171, which has been automatically raised during the progress of the winding of the last coil, descends to its normal position in readiness for the commencement of a new coil. The operator also takes hold of the arm 124 and raises the guide-pulley 121 out of the way so that she is not troubled by its presence in proximity to the coil while she is removing the completed coil and applying a new tube to the spindle. After the fresh tube has been applied to the chuck or spindle and the wire has been secured in place, the operator, by manipulating the release member 160, twists the arm 124 into a position low enough to bring the guide-pulley 121 into its proper relation to the surface of the tube so that the first layer will be wound uniformly upon the tube. The automatic elevation of the guide-pulley 121 as the coil increases in size, is effected by means of the pencils 148 and 149 engaging the blades 141 and 142 of the pawl-lever 140, as has previously been described. In order to insure that the right number of turns is applied to each coil which is being wound, I prefer to connect a revolution-counter 236 to the spindle of the motor, the rotation of the machine being arrested as soon as the required number of turns has been wound on the coil. Sometimes, when a wire breaks or when a new coil is started, it is necessary to move the guide-pulley 121 along the spindle without rotating the latter in order to commence winding the wire in the proper direction and in the right position on the coil. This is conveniently taken care of by means of the hand-wheel 70, the clutch members 60 and 61 first having been disconnected by the lever 66.

In practice, I make the springs 103 and 104, which operate on the switch fingers 95 and 96, quite powerful, so that the time consumed by the rod 85 in oscillating from one to the other of its angular positions, is relatively short; in fact, practically instantaneous. However, the oscillatory movement of the rod 85 is not cut down to such a small amount that the flash or momentary wiping contact between the contact blade 195 and the lips 202 is ineffective to operate the solenoid 181. The current comsumed by the solenoid 181 is negligible, because the duration of closing of the contact is an insignificant fraction of a second. By placing the paper injector under the control of the mechanism which effects the change in the direction of feed of the wire-guiding means, I insure that each strip of paper is introduced into the coil at the precise instant when the direction of feed changes.

Although I have illustrated as a preferred embodiment of my invention a machine adapted to wind the particular coil illustrated, it should be understood that many of its details may be varied widely without sacrificing any of the benefits or advantages derived from the invention; hence, I do not limit myself to the details shown, except as specified in the appended claims.

I claim—

1. In apparatus for winding electrical coils, the combination of a constantly rotating spindle, a carriage adapted to travel in a direction parallel with the axis of the spindle, means synchronized with the spindle for automatically reciprocating said carriage, a pulley for guiding the wire onto the coil being wound, a member carrying said pulley and pivoted on said carriage to swing in a plane substantially at right-angles to the axis of the winding spindle, means for automatically and progressively rotating said member on its pivot during the winding of the coil whereby the guide-pulley is progressively moved outwardly away from the axis of the coil and maintained substantially at the same distance from the surface thereof as the coil increases in diameter, and a clutch mechanism interposed between said member and the rotating means therefor whereby inward movements of the arm on its pivot are prevented.

2. In apparatus for winding electrical coils, the combination of a constantly rotating spindle, a carriage adapted to travel in a direction parallel with the axis of the spindle, means synchronized with the spindle for automatically reciprocating said carriage, a pulley for guiding the wire onto the coil being wound, an arm member carrying said pulley and pivoted on said carriage to swing in a plane substantially at right-angles to the axis of the winding spindle, means for automatically and progressively rotating said member on its pivot during the winding of the coil whereby the guide-pulley is progressively moved outwardly away from the axis of the coil and maintained substantially at the same distance from the surface thereof as the coil increases in diameter, a clutch mechanism interposed between said member and the rotating means therefor whereby inward movements of the arm on its pivot are prevented, and clutch-disengaging means manually operable to permit the inward rotary movements of the arms.

3. In apparatus for winding electrical coils, the combination of a constantly rotating spindle, a carriage adapted to travel in a direction parallel with the axis of the spindle, means synchronized with the spindle for automatically reciprocating said carriage, a pulley for guiding the wire onto the coil being wound, a member carrying said pulley and pivoted on said carriage to swing in a plane substantially at right-angles to the axis of the winding spindle, means for automatically and progressively rotating said member on its pivot during the winding of the coil whereby the guide-pulley is progressively moved outwardly away from the axis of the coil and maintained substantially at the same distance from the surface thereof as the coil increases in diameter, a clutch mechanism interposed between said member and the rotating means therefor whereby inward movements of the member on its pivot are prevented, clutch-disengaging means manually operable to permit inward rotary movements of the member, and a stop member adapted automatically to disengage said clutch mechanism after a predetermined outward movement of said member on its pivot.

4. In coil-winding apparatus, the combination of a continuously rotating spindle, a carriage adapted to travel in a direction parallel with the axis of the spindle, means synchronized with the spindle for automatically reciprocating said carriage, a pulley for guiding wire onto the coil, an arm carrying said pulley and pivoted on said carriage to swing in a plane substantially at right-angles to the axis of the winding spindle, means for automatically and progressively rotating said arm on its pivot during the winding of the coil, whereby the guide-pulley is progressively elevated and moved outwardly away from the axis of the coil, clutch dogs interposed between said elevating means and said arm normally adapted to elevate said arm, and manually operated means for disengaging said clutch dogs.

5. In apparatus of the class described, the combination of a winding spindle, a reciprocatory feed carriage, a guide-pulley, an arm carrying said pulley and pivoted on said carriage to swing in a plane substantially at right-angles to the axis of the winding spindle, a worm-gear concentric with the pivot of said arm, means for automatically and progressively rotating said worm-gear, controlled and operated by the reciprocatory movements of said carriage, and a clutch interposed between said worm-gear and said pivot adapted normally to prevent movement of said arm and pulley inwardly toward said spindle whereby the rotation of the worm-gear causes the arm and pulley to move outwardly away from the spindle.

6. In apparatus of the class described, the combination of a winding spindle, a reciprocatory feed carriage, a guide-pulley, an arm carrying said pulley and pivoted on said carriage to swing in a plane substantially at right-angles to the axis of the winding spindle, a worm-gear concentric with the pivot of said arm, means for automatically and progressively rotating said worm-gear, controlled and operated by the reciprocatory movements of said carriage, a clutch interposed between said worm-gear and said pivot adapted normally to prevent movement of said arms and pulley inwardly toward said spindle whereby the rotation of the worm-gear causes the arm and pulley to move outwardly away from the spindle, and means for releasing said clutch manually-operated to permit inward movement of said pulley toward the spindle.

7. In a machine of the class described, the combination of a winding spindle, a carriage reciprocable in a direction parallel with the axis of the spindle, a wire-guide pulley, an arm carrying said pulley and pivoted to said carriage, a worm-gear mounted on said carriage concentric with the pivot of said arm, clutch mechanism interposed between said arm and said gear, a worm engaging said gear, and ratchet mechanism connected to said worm and operable by the reciprocatory movements of said carriage.

8. In a machine of the class described, the combination of a winding spindle, a carriage reciprocable in a direction parallel with the axis of the spindle, a wire-guide pulley, an arm carrying said pulley and pivoted on said carriage, a worm-gear mounted on said carriage concentric with the pivot of said arm, a clutch dog pivoted upon said arm and provided with resilient means normally tending to force the outer end of said dog into driving engagement with said gear, means manually operable to release said dog, a worm engaging said gear, and ratchet mechanism connected to said worm and operable by the reciprocatory movements of said carriage.

9. In automatic coil-winding apparatus, the combination of a winding spindle, a support, a reciprocatory carrier for receiving strips of paper to be introduced between the layers of wire, said carrier being adapted to slide in said support in a direction transverse to the axis of the winding spindle, means automatically tending to impel said carrier toward the coil being wound on said spindle, latch mechanism for controlling said impelling means, reciprocatory wire-feeding mechanism, means for progressively and bodily elevating said support, and electrical means carried by said support and controlled by the reciprocatory movement of said wire-feeding means for releasing said latch whereby a strip of paper carried by said carrier is injected into the coil being wound.

10. In apparatus for winding electrical coils having layers of paper interposed between adjacent layers of wire, the combination of a continuously rotating winding spindle, wire-guiding means, means for automatically reciprocating said wire-guiding means, a support, a reciprocatory carrier for receiving strips of paper to be introduced between the layers of wire being wound on said spindle and adapted to slide in said support in a direction transverse to the axis of the winding spindle, a spring tending to move said carrier in said support toward the coil being wound on said spindle, latch mechanism for preventing movement of said carrier toward the coil, electrical means mounted on said support and controlled by the reciprocatory movements of said wire-guiding means adapted to release said latch, and means controlled by the transverse movements of said carrier for progressively and automatically elevating said support during the winding of the spindle.

11. In apparatus for winding electrical coils having layers of paper interposed between adjacent layers of wire, the combination of a continuously rotating winding spindle, wire-guiding means, means for automatically reciprocating said wire-guiding means, a support, a reciprocatory carrier for receiving strips of paper, one at a time, to be introduced between the layers of wire being wound on said spindle and adapted to slide in said support in a direction transverse to the axis of the winding spindle, a spring tending to move said carrier in said support toward the coil being wound on said spindle, latch mechanism for preventing movement of said carrier toward the coil, electrical means controlled by the reciprocatory movements of said wire-guiding means adapted to release said latch, and rock mechanism for progressively and automatically elevating said support during the winding of the coil and controlled by the reciprocatory movements of said paper-carrier whereby the position of the plane of injection of the paper is maintained in proper relation to the surface of the coil as the latter is being wound.

12. In a machine of the class described, the combination of a winding spindle, a support having a slideway in its upper surface transverse to the axis of said spindle, a paper injector-slide having a channel in its upper surface adapted to admit a strip of paper to be introduced into a coil being wound, a spring tending to force said paper-carrier toward the spindle, a release magnet mounted on said support directly beneath said slide, an armature for said magnet having an upper extremity directly engaging and preventing movement of said slide, wire-guiding means, means for automatically reciprocating said wire-guiding means, switch mechanism associated with said wire-guiding means for supplying current to said release magnet at predetermined points in the movement of said wire-guiding means, and means for automatically and progressively elevating said support to bring the injection plane in proper relation to the surface of the coil being wound.

13. In a machine of the class described, the combination of a winding spindle, a support having a slideway in its upper surface transverse to the axis of said spindle, a paper injector having a channel in its upper surface adapted to admit a strip of paper to be introduced into a coil being wound, a spring tending to force said paper-carrier toward the spindle, a latch mechanism for preventing inward movement of said paper-carrier toward said spindle, a release magnet carried by said support, wire-guiding means, means for automatically reciprocating said wire-guiding means, switch mechanism associated with said wire-guiding means for supplying current to said release magnet at predetermined points in the movement of said wire-guiding means, and means for automatically and progressively elevating said support to bring the injection plane in proper relation to the surface of the coil being wound, comprising rack-and-pinion mechanism and ratchet mechanism operating said rack-and-pinion mechanism and controlled and operated by the reciprocatory movement of said paper-carrier on said support.

ALBERT BEUTLER.

Witnesses:
C. A. SOANS,
M. M. LEPPO.